United States Patent

Tajima et al.

[11] Patent Number: 5,776,026
[45] Date of Patent: Jul. 7, 1998

[54] POWER TRANSMISSION BELT AND METHOD OF MANUFACTURING THE SAME

[75] Inventors: Yoshitaka Tajima; Sizuaki Tsuruta; Hirotaka Hatai; Takamitsu Akashi, all of Kobe, Japan

[73] Assignee: Bando Chemical Industries, Ltd., Kobe, Japan

[21] Appl. No.: 716,236

[22] PCT Filed: Jan. 22, 1996

[86] PCT No.: PCT/JP96/00127

§ 371 Date: Sep. 20, 1996

§ 102(e) Date: Sep. 20, 1996

[87] PCT Pub. No.: WO96/22479

PCT Pub. Date: Jul. 25, 1996

[30] Foreign Application Priority Data

Jan. 20, 1995 [JP] Japan ................... 7-006837

[51] Int. Cl.[6] ........................................ F16G 1/04
[52] U.S. Cl. ............... 474/267; 474/253; 474/264; 474/265; 474/266; 474/268; 474/271
[58] Field of Search ................... 474/267, 253, 474/264, 266, 268, 265, 271

[56] References Cited

U.S. PATENT DOCUMENTS 4,299,587 11/1981 Imamura ................. 474/267 X
4,589,233 5/1986 Parekh et al. ............ 474/267 X
5,344,369 9/1994 Kitahama et al. ........... 474/253
5,454,761 10/1995 Takahashi et al. .......... 474/253

FOREIGN PATENT DOCUMENTS

| 55142148 | 11/1980 | Japan . |
| 59-4197 | 2/1984 | Japan . |
| 59093550 | 5/1984 | Japan . |
| 3-33536 | 6/1989 | Japan . |
| 02003724A | 1/1990 | Japan . |
| 5-44608 | 11/1993 | Japan . |

*Primary Examiner*—C. D. Crowder
*Assistant Examiner*—Tina R. Taylor
*Attorney, Agent, or Firm*—Sixbey Friedman Leedom & Ferguson; Gerald J. Ferguson, Jr.; Thomas W. Cole

[57] ABSTRACT

A top fabric 2 which is disposed on the back face of a power transmission belt 1 is obtained by joining a plurality of rubberized fabric pieces 2a, in each of which warps 7 and wefts 8 intersect each other at an obtuse angle which is open toward the direction of the length of the belt, in the shape of a ring. Joining lines of adjacent fabric pieces 2a, 2a both intersect at a right angle with respect to the direction of the length of the belt and are parallel to each other.

10 Claims, 9 Drawing Sheets

POWER TRANSMISSION BELT AND METHOD OF MANUFACTURING THE SAME

[TECHNICAL FIELD]

The present invention relates to a power transmission belt with a top fabric of canvas disposed on a back face of the belt, and a method of manufacturing the same.

[BACKGROUND]

One example of a power transmission belt with a top fabric disposed on a belt back face is a V-ribbed belt. The V-ribbed belt is so composed that a top fabric is adhered to a back face of an adhesion rubber in which a tension member is buried, and that a rib rubber is formed which is comprised of a plurality of V-shaped projecting ribs which are arranged on an inner side surface of the adhesion rubber in a direction of the length of the belt (See Japanese Patent Application Laid-open Gazette No. 4-151048). The top fabric of the V-ribbed belt disclosed in this gazette is a bias fabric, which is obtained by cutting a woven fabric at a biased angle of 45 degrees and joining edges of a plurality of resultant cut fabrics so that warps and wefts are each inclined at 45 degrees with respect to the direction of the length of the belt.

Meanwhile, there is also known another top fabric which is obtained by stretching a woven fabric and rubberizing the stretched fabric in such a manner that warps and wefts intersect each other at an obtuse angle which is open toward the direction of the length of the belt. The reason for completing the top fabric as such is to improve the elasticity of the top fabric along the direction of the length of the belt and to enhance the bending property of the power transmission belt. Now, a conventional method of manufacturing such a top fabric will be described with reference to FIG. 14.

Figure 14A:
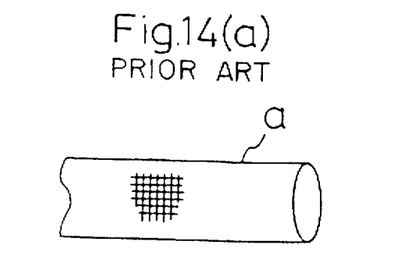
FIG. 14 are views showing a conventional method of manufacturing a tubular fabric for top fabric.
Figure 14B:
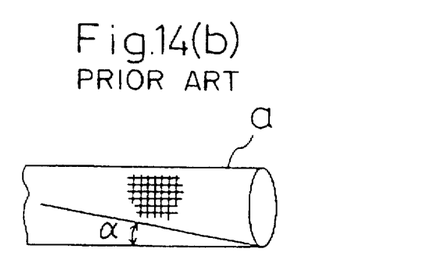
Figure 14C:
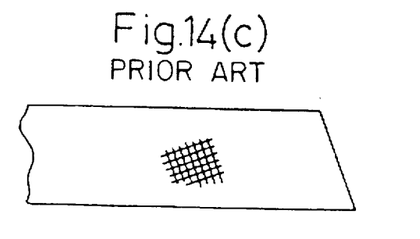
Figure 14D:
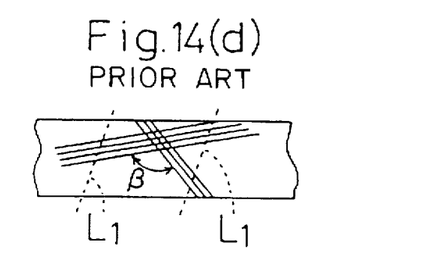
Figure 14E:
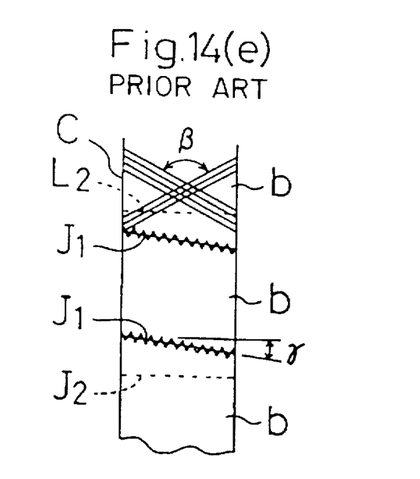
Figure 14F:
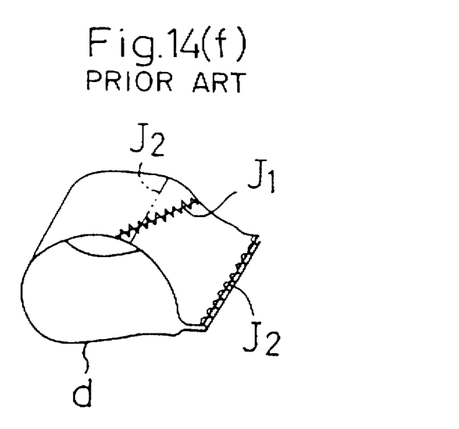

A tubular woven fabric a as shown in FIG. 14 (a) is severed spiral at an angle α, as shown in FIG. 14(b). The fabric is developed as shown in FIG. 14(c) and is stretched along its longitudinal direction as shown in FIG. 14(d), so that an intersection angle of warps and wefts becomes an obtuse angle β. The fabric is rubberized as it is such, whereby the warps and the wefts are fixed at that intersection angle. The fabric is then severed along lines L1 which are inclined with respect to the longitudinal direction. As a result, a plurality of fabric pieces b are obtained each with the obtuse angle β open toward the longitudinal direction.

The obtained plurality of fabric pieces b are successively overlapped each other at edges and are sewed together by an overlooking sewing machine, thereby creating a long band-like fabric c as that shown in FIG. 14 (e). The band-like fabric c is cut along lines L2 which extend in the direction of the width, each into a length which is needed to create a top fabric for a power transmission belt. Both edges of the severed fabrics are overlapped each other, and are sewed together at overlapped portions by an overlooking sewing machine as shown in FIG. 14 (f), whereby a tubular fabric d for making the top fabric is obtained.

In the band-like fabric c described above, since the obtuse angle β becomes inclined rather than becoming open in the width direction of the woven fabric when the woven fabric is stretched, joining lines $J_1$ of the fabric pieces b become inclined at an angle of γ with respect to the width direction. Hence, joining lines $J_2$ of the resultant tubular fabric d and the joining lines $J_1$ do not become parallel to each other.
Problems to be solved An object of the present invention is to solve the following problems associated with the above-mentioned power transmission belt.

(1) The appearance of the power transmission belt is poor since the joining lines $J_1$ and $J_2$ which are not parallel to each other are visible in the surface of the power transmission belt.

(2) Since the joining lines $J_1$ of the fabric pieces are inclined with respect to the width direction of the belt, where the fabric pieces were sewed together with an overlooking sewing machine, if the power transmission belt is operated for a long time, a sewing thread easily gets worn away and cut because of contact with a pulley which is disposed on the back face side of the belt. In other words, the fact that the joining lines $J_1$ are inclined means that the sewing thread itself is inclined with respect to the longitudinal direction of the belt. Therefore, if slip occurs between the back face of the belt and the pulley, the sewing thread is subjected to force which tries to displace the sewing thread diagonally from a traverse direction, or force which tries to strip the sewing thread off from the fabric. Thus, the sewing thread easily gets cut due to abrasion.

If the sewing thread is cut, stress created by bending of the power transmission belt concentrates on joining portions of the fabric pieces, which in turn causes stripping of the top fabric, and further, cracking or cutting of the power transmission belt.

The sewing thread serves to join the rubberized fabric pieces, but in general, is not rubberized itself. This makes cutting of the sewing thread more likely. However, even when rubberization is performed after sewing the fabric pieces together, the problem of cutting of the sewing thread is created as the coating rubber gets worn away.

(3) Depending on the length of a power transmission belt to manufacture, it is necessary to cut the band-like fabric c into a necessary length, as diagonally traversing the joining lines $J_1$. In such a case, just like the joining line $J_2$ shown as an imaginary line in FIG. 14(f), the joining line $J_2$ intersects with the joining line $J_1$ in the resultant tubular fabric for obtaining the top fabric. Since sewing threads also cross each other in a crossing portion of the joining lines $J_1$ and $J_2$, the joining strength of the sewing threads to join the fabric pieces together is low, which deteriorates the strength of the top fabric. The power transmission belt becomes poor in bending property due to crossing of the sewing threads, leading to early stripping of the top fabric or early cracking of the belt.

(4) When the power transmission belt having such a crossing portion is disposed as a defect or when the band-like fabric c is cut into a necessary length so as to traverse the joining lines $J_1$ in order to avoid the problems above, the band-like fabric c may be partially cut away in such a manner not to traverse the joining lines $J_1$. However, the yield of fabric deteriorates in either case.

(5) Since the angle of the warps with the stretching direction is different from the angle of the wefts with the stretching direction during stretching of the woven fabric which was cut spiral and developed, tensile force upon the warps is not equal to tensile force upon the wefts. Hence, when the pulley is put against the back face of the power transmission belt, thrust force affects the power transmission belt because of the imbalance between the warps and the wefts, thereby causing side tracking or zigzagging of the belt.

(6) Since edges of fabrics overlap, thereby creating steps at the joining lines $J_1$ and $J_2$, a noise is produced when the pulley on the back face side of the power transmission belt passes over the steps. In addition, at the joining lines $J_1$ which are inclined at an angle with respect to the width direction of the belt, the steps apply thrust force upon the power transmission belt, which in turn serves as a cause of side tracking of the belt.

[DISCLOSURE OF INVENTION]

Inventors of the present invention have conducted tests to the above-mentioned problems and have studied the problems, and have found that the problems (1) to (5) can be solved if the angle $\alpha$ of cutting the tubular fabric spiral is set appropriately, and that the problem (6) can be solved by changing the way in which fabrics are sewed together, eventually completing the present invention. Now, the contents of the present invention will be described specifically.

A power transmission belt with a top fabric on a back face of the belt according to the present invention is characterized in that the top fabric is obtained by joining a plurality of fabric pieces in the shape of a ring, each obtained by stretching a plain woven fabric, rubberizing the woven fabric in such a manner that warps and wefts intersect each other at an obtuse angle which is open toward the direction of the length of the belt, and in that a joining line of any adjacent fabric pieces extends in a direction orthogonal to the direction of the length of the belt.

In the power transmission belt, since adjacent joining lines each extend in the direction orthogonal to the direction of the length of the belt and are parallel to each other, the appearance does not deteriorate. Further, since there is no intersection in the joining lines, there is no portion where the power transmission belt partially becomes poor in bending property, which in turn prevents early stripping of the top fabric and improves the durability of the power transmission belt.

The adjacent fabric pieces are preferably abutted on and sewed to each other, and the height of an uneven part in the sewed portion is 14 μm or smaller on the back face side of the belt.

This almost eliminates a step at edges of any adjacent fabric pieces, and prevents vibration or a noise because of contact of the power transmission belt with a pulley located on the back face side.

Although the sewing thread sinks into the fabric pieces as the rubberized fabric pieces consisting the top fabric softens during curing of the power transmission belt, the sewing thread does not sink completely depending on its thickness. While the sewing thread tends to sink as the quantity of rubber coating the fabric pieces increases, the thickness of the sewing thread is preferably 0.2 mm or thinner to reduce the unevenness due to the thickness of the sewing thread on surfaces of the rubberized fabric pieces which are generally used for the belt.

It is necessary to ensure that the fabric pieces do not bend at their abutted edges, and in addition, it is preferable to ensure that there is no gap between the abutted edges of the fabric pieces. This is because, although rubber flows into and fills up a gap during curing and flattens out the gap, rubber having flowed into the gap wears away earlier than fabric portions due to contact with the pulley of the back face side, thereby eventually creating a step. Considering this, even when a gap between the edges of the fabric pieces is inevitable, it is preferable to ensure that the gap is 1 mm or smaller.

A sewing thread which sews the fabric pieces preferably extends in the direction of the length of the belt.

Where the sewing thread extends in the direction of the length of the belt, even if a slip is created between the power transmission belt and the pulley of the back face side of the belt, the sewing thread is not subjected to any large force which tries to strip the sewing thread off from the fabric or to any large force which tries to displace the sewing thread. This advantageously prevents cutting of the sewing thread and improves the durability of the belt.

The present invention is applicable to various types of power transmission belts. In particular, the present invention is suitably applied to a V-ribbed belt which comprises: a tension member spirally arranged to extend in the longitudinal direction of the belt; an adhesion rubber for keeping the tension member at a proper position; and a compression rubber bonded to the inner face of the adhesion rubber, wherein the outer face of the adhesion rubber is covered with the top fabric, and a plurality of V-shaped ribs are arranged on the inner face side of the compression rubber to extend in the longitudinal direction of the belt.

This is because such a V-ribbed belt, due to its excellent transmission performance, often includes a multi-pulley drive in which two or more driven shafts are rotated by one belt, and an idler (pulley) is often used which is disposed on the back face side of the belt for adjustment of a contact angle of the belt and the pulley, and the like.

In a power transmission belt comprising:

a tension member spirally arranged to extend in the longitudinal direction of the belt;

an adhesion rubber for keeping the tension member at a proper position; and a compression rubber bonded to the inner face of the adhesion rubber, the outer face of the adhesion rubber being covered with the top fabric, the adhesion rubber being formed in a way of aligning two uncured rubber sheets respectively located on the belt inner face side and the belt outer face side with each other through the tension member interposed between the uncured rubber sheets and curing the uncured rubber sheets, if a joining line of any adjacent fabric pieces extends in a direction orthogonal to the direction of the length of the belt, the adjacent fabric pieces are abutted on and sewed to each other at edges and the height of an uneven part in the sewing portion is 14μm or smaller on the back face side of the belt, or if a sewing thread of the fabric pieces extends in the direction of the length of the belt, the power transmission belt is preferably composed as follows.

The top fabric is formed in the shape of a ring in a way of abutting and sewing both edges of a band-like fabric for top fabric, the band-like fabric being made of the plurality of fabric pieces and being formed into the length corresponding to the entire length of the power transmission belt.

Further, the uncured rubber sheet located on the belt outer face side is stacked on the fabric for top fabric so as to be integral with each other, is abutted at both edges while the fabric for top fabric is abutted at both edges, and is sewed at both the edges together with both the edges of the fabric for top fabric.

Under the above structure, both the edges of the uncured rubber sheet located on the belt outer face side are not required to be overlapped for joint. Accordingly, no step is produced on the outer face of the adhesion rubber formed by the above rubber sheet. This reduces production of vibration and noise when the resultant power transmission belt is used.

Next, description will be given on methods which are suitable to manufacture a power transmission belt having such advantages as above according to the present invention.

More specifically, one of the manufacturing methods is characterized by comprising the steps of:

- cutting a tubular woven fabric spirally at an angle of 45 degrees with respect to the direction of the length of the tube and developing the fabric;
- stretching the developed fabric in the direction of cutting so that warps and wefts of the fabric intersect each other at an obtuse angle, and rubberizing the stretched fabric so that the warps and the wefts are fixed at the intersecting angle;
- cutting the rubberized fabric at predetermined intervals in a direction orthogonal to the direction of stretching to create a plurality of fabric pieces;
- successively sewing the plurality of fabric pieces at edges of the direction orthogonal to the direction of stretching to create a long band-like fabric;
- cutting the band-like fabric at intervals corresponding to a peripheral length of a top fabric of a power transmission belt, in a widthwise direction of the band-like fabric;
- sewing the resultant fabric at edges to obtain a tubular fabric for top fabric;
- fitting the tubular fabric into a cylindrical mandrel, an uncured rubber sheet, wrapping an uncured rubber sheet, a tension member and an uncured rubber sheet around the mandrel in this order on the tubular fabric, and curing the uncured rubber sheets to form a power transmission belt sleeve; and
- removing the power transmission belt sleeve from the mandrel, cutting the power transmission belt sleeve into round slices, and reversing the cut sleeve inside out thereby obtaining a power transmission belt.

The respective steps of the manufacturing method as above will be specifically described.

The reason why the tubular woven fabric is cut spirally at an angle of 45 degrees with respect to the longitudinal direction of the tube is that this inclines warps and wefts both at 45 degrees with respect to the cutting lines. Hence, when the developed fabric is stretched in the cutting direction, the fabric extends in the direction of stretching to have a decreased width, and the warps and the wefts rotate and move by the same angle, changing from the state in which they used to intersect each other at 90 degrees into a state in which they intersect each other at an obtuse angle (acute angle). The obtuse angle is open toward a direction orthogonal to the cutting direction (the stretching direction), and tension force upon the warps becomes substantially equal to tension force upon the wefts.

After fixing the warps and the wefts as they intersect each other at the obtuse angle by rubberizing the stretched fabric, the fabric is cut at the predetermined intervals in the direction orthogonal to the stretching direction, thereby creating a plurality of fabric pieces. By successively sewing fabric pieces at their edges in the direction orthogonal to the stretching direction, the long band-like fabric with the obtuse angle open to the longitudinal direction is obtained. Joining lines of the fabric pieces which are sewed to each other all extend in the direction orthogonal to the longitudinal direction of the band-like fabric.

Next, the band-like fabric is cut at the intervals corresponding to the peripheral length of the top fabric of the power transmission belt in a widthwise direction of the band-like fabric, and the cut fabrics are sewed at their edges. Thus, in the resultant tubular fabric for making the top fabric, joining lines of sewing are orthogonal to the longitudinal direction, just like the joining lines of the adjacent fabric pieces. That is, the joining lines do not intersect each other.

Hence, the tubular fabric is fit into a cylindrical mandrel, an uncured rubber sheet, a tension member and an uncured rubber sheet are wrapped around the mandrel in this order on the tubular fabric and the uncured rubber sheets are cured, so that a power transmission belt sleeve is obtained. By removing the sleeve from the mandrel, cutting it in round slices and turning it inside out, a desired power transmission belt is completed.

In this case, of the two uncured rubber sheets, one which is wrapped around on the tubular fabric serves as an adhesion rubber which remains in tight contact with the tension member and keeps the tension member at a proper position, while bonded to the top fabric, thereby keeping the top fabric attached to the belt. The other uncured rubber sheet serves as a compression rubber (or a bottom rubber) if the belt is a V-belt but as rib rubber if the belt is a V-ribbed belt.

Thus, the manufacturing method has these advantages. Since the method does not cause the joining lines to intersect each other, in particular, the yield for making the tubular fabric from the band-like fabric is improved, or no defective power transmission belt is manufactured.

Further, since tension force upon the warps becomes substantially equal to tension force upon the wefts when the developed fabric is stretched, even when the power transmission belt contacts a pulley located on the back face side of the belt, the power transmission belt is subjected to equal force on the right side and the left side. Hence, shifting or zigzagging of the belt is prevented.

In the method of manufacturing a power transmission belt as above, when the band-like fabric is formed and the tubular fabric for top fabric is formed, both edges of the fabric are preferably abutted on and sewed to each other. This creates almost no step at the sewing portions.

In addition, when both the edges of the fabric are sewed together, it is preferable to ensure that a sewing thread extends in the longitudinal direction of the fabric. This protects the sewing thread from undergoing force from a horizontal direction even during contact with back face side pulley, as described before.

Another suitable manufacturing method is characterized by:

- cutting a tubular woven fabric spirally at an angle of 45 degrees with respect to the direction of the length of the tube and developing the cut fabric;
- stretching the developed fabric in the direction of cutting so that warps and wefts of the fabric intersect each other at an obtuse angle, and rubberizing the stretched fabric so that the warps and the wefts are fixed at the intersecting angle;
- stacking an uncured rubber sheet on one face of the rubberized fabric and pressing the rubber sheet and the fabric to form a laminate in which the fabric and the rubber sheet are formed into one piece;
- cutting the laminate at predetermined intervals in a direction orthogonal to the direction of stretching to form a plurality of laminate pieces;
- successively abutting and sewing the plurality of laminate pieces at edges of the direction orthogonal to the direction of stretching to form a long laminate band;

cutting the laminate band at intervals corresponding to the peripheral length of the power transmission belt in a widthwise direction of the band-like fabric;

rolling the resultant cut piece into a tube so that the rubber sheet is located on the outer periphery side and abutting and sewing both edges of the cut piece thereby forming a tube;

fitting the tube into a cylindrical mandrel, wrapping a tension member and an uncured rubber sheet around the mandrel in this order on the tube, and curing the uncured rubber sheets to form a power transmission belt sleeve; and removing the power transmission belt sleeve from the mandrel, cutting the power transmission belt sleeve into round slices, and reversing the cut sleeve inside out thereby obtaining a power transmission belt.

According to the above manufacturing method, there can be obtained a power transmission belt having no step on the outer face of the adhesion rubber. It is not necessary to wrap a special uncured rubber sheet around the mandrel in order to form a part located on the outer face side of the adhesion rubber. This reduces the number of steps for manufacturing a power transmission belt by means of the mandrel, thereby improving manufacturability and eliminating a problem of defective wrapping of the uncured rubber sheet around the mandrel.

Even in the above manufacturing method, when edges of the laminate pieces are sewed together and when edges of the cut piece are sewed together, it is preferable that sewing is made so that the sewing thread extends in the longitudinal direction of the power transmission belt.

[BEST MODE FOR CARRYING OUT THE INVENTION]

An embodiment of the present invention will be described in the following, with reference to the associated drawings.

<Structure Of Power Transmission Belt>

Figure 1:
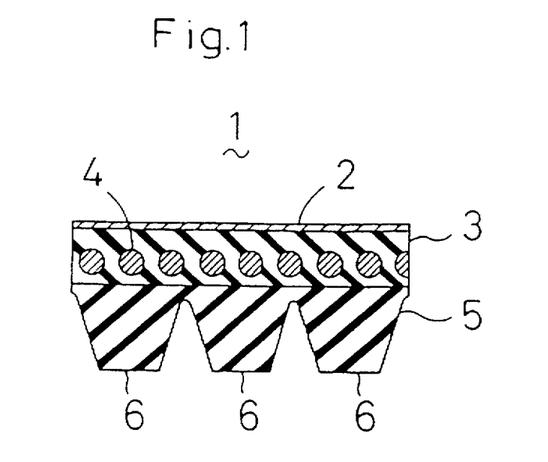
FIG. 1 is a cross sectional view of a power transmission belt (V-ribbed belt) according to an embodiment.

In a V-ribbed belt (power transmission belt) 1 shown in FIG. 1, denoted at 2 is a top fabric which is disposed on the back face side of the belt, denoted at 3 is an adhesion rubber which adheres to a tension member 4 and keeps the tension member 4 at a proper position, and denoted at 5 is a rib rubber disposed on the inner face side of the belt, which is formed by arranging a plurality of V-shaped projecting ribs 6 each extending in the direction of the length of the belt all over the entire face of the belt.

Figure 2:
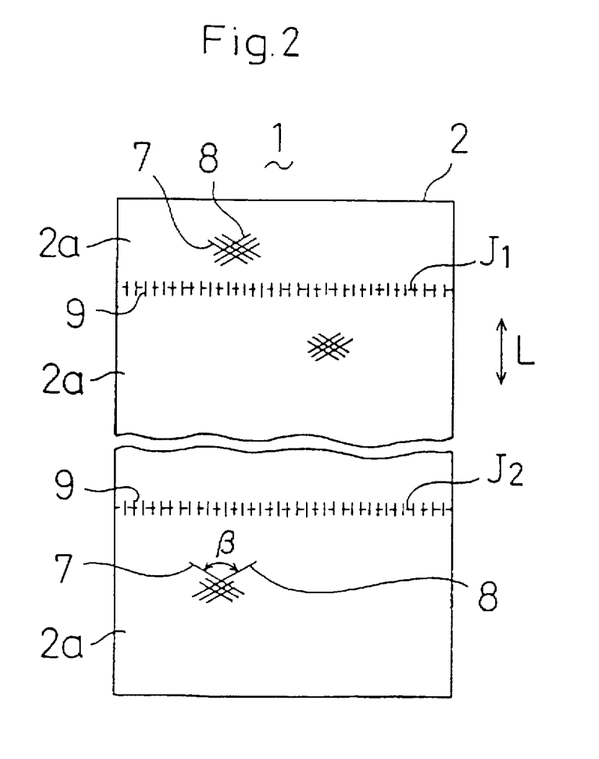
FIG. 2 is a partial plan view of the belt.
Figure 3A:
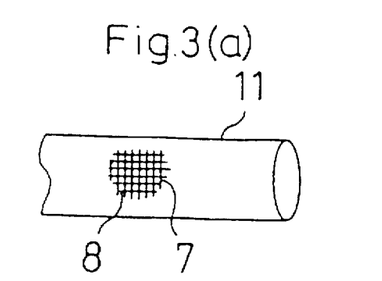
FIG. 3 is views showing a method of manufacturing a tubular fabric for top fabric of the belt.
Figure 3B:
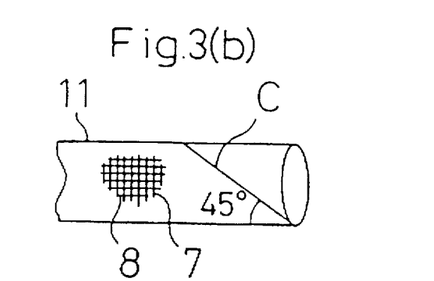
Figure 3C:
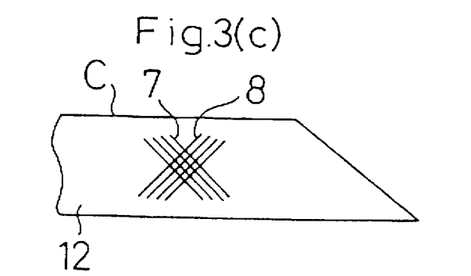
Figure 3D:
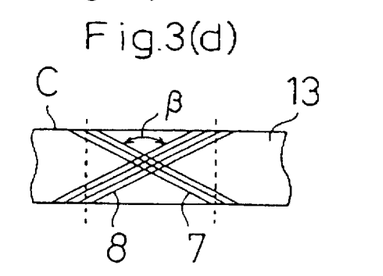
Figure 3E:
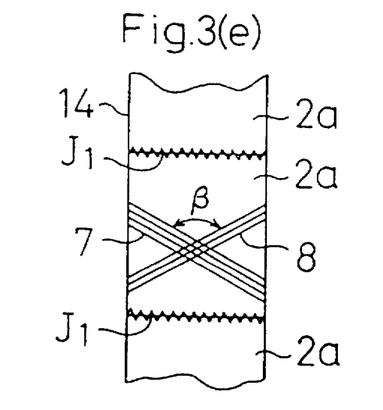
Figure 3F:
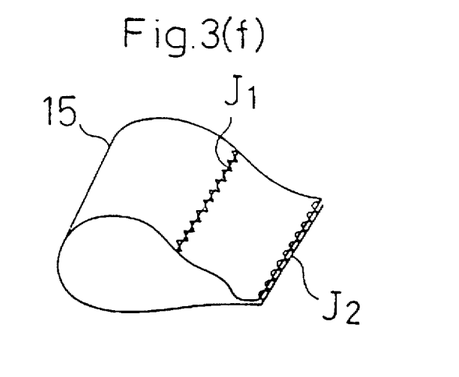

The top fabric 2 is obtained by joining, as shown FIG. 2, a plurality of rubberized fabric pieces 2a and making it in a ring shape as shown in FIG. 3(f). The fabric pieces 2a are each obtained by stretching and rubberizing a plain woven fabric in such a manner that warps 7 and wefts 8 intersect each other at an obtuse angle $\beta$(120 degrees in this embodiment) which opens toward the longitudinal direction L of the belt. Joining lines $J_1$ and $J_2$ of adjacent fabric pieces 2a and 2a both extend in a direction orthogonal to the longitudinal direction L of the belt. The adjacent fabric pieces 2a and 2a are joined to each other by abutting edges of the fabric pieces 2a and 2a and sewing the fabric pieces 2a and 2a together at the abutting portions by an overlooking sewing machine so that a sewing thread 9 forms stitches that run along the longitudinal direction of the belt. The height of an uneven part in the sewing portion is 14 μm or smaller on the back face side of the belt.

<Method Of Manufacturing Power Transmission Belt>

Next, a method of manufacturing a V-ribbed belt 1 will be described, with reference to FIG. 3.

As shown in FIG. 3(a), a tubular woven fabric 11 is cut spirally at an angle of 45 degrees with respect to the longitudinal direction of the tube and is developed (See FIGS. 3(b) and 3(c)). A developed fabric 12 is stretched in the spirally cutting direction C in such a manner that the warps 7 and the wefts 8 intersect each other at an obtuse angle $\beta$, and a stretched fabric 13 is rubberized, whereby the warps 7 and the wefts 8 are fixed as they intersect each other at the angle $\beta$ (See FIG. 3(d)). As herein termed, "rubberizing" refers to coating of a stretched fabric with a sizing rubber and subsequent drying.

Next, the rubberized fabric 13 is cut in a direction orthogonal to the stretching direction (i.e., cutting direction) C at predetermined intervals, thereby producing a plurality of fabric pieces (See FIG. 3(d)). The resulting fabric pieces 2a are abutted on each other at edges which extend in the direction orthogonal to the stretching direction C, and are successively sewed together at the abutting portions with an overlocking sewing machine, thereby creating a long band-like fabric 14 (See FIG. 3(e)). In the band-like fabric 14, the joining lines $J_1$, $J_1$ of the fabric pieces 2a, 2a are orthogonal to the longitudinal direction and are parallel to each other.

The band-like fabric 14 is cut at intervals corresponding to the peripheral length of the top fabric 2 of the V-ribbed belt 1 in a widthwise direction of the band-like fabric. Both edges of the resultant fabric are abutted on each other and are sewed at the abutting portion with an overlooking sewing machine, thereby obtaining a tubular fabric 15 for top fabric (See FIG. 3(f)). In the tubular fabric 15, the joining line $J_2$ at the edge portion is parallel to the joining line $J_1$.

Next, the tubular fabric 15 is fit into a cylindrical mandrel. An uncured rubber sheet for forming a part located on the outer face side of the adhesion rubber 3, a tension member 4, an uncured rubber sheet for forming a part located on the inner face side of the adhesion rubber 3 and an uncured rubber sheet for forming a rib rubber 5 are wrapped around the mandrel in this order on the tubular fabric 15, and curing is performed on the uncured rubber sheets to obtain a power transmission belt sleeve.

The outer face of the power transmission belt sleeve is ground away by a grinding wheel so as to form multiple grooves extending in a circumferential direction at intervals in a width direction so that multiple ribs 6 are formed. Then, the power transmission belt sleeve is removed from the mandrel, is cut into round slices in the width of a desired V-ribbed belt, and is turned inside out so that the V-ribbed belt 1 as that shown in FIGS. 1 and 2 is obtained.

<Relationship Between Method Of Joining Fabric Pieces (Surface Unevenness Height) And Noise>

Figure 4:
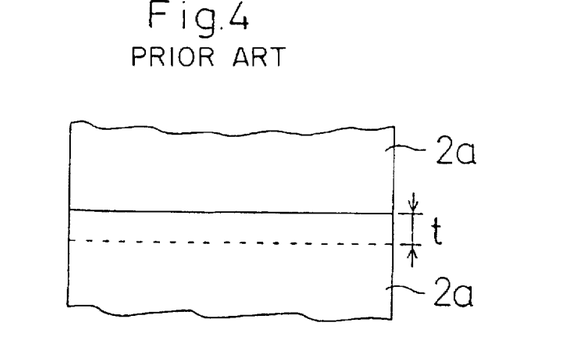
FIG. 4 is a partial plan view of a belt which adopts a right-angle joint method.
Figure 5:
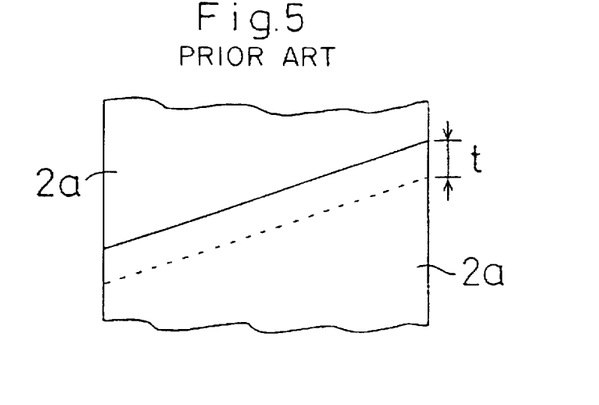
FIG. 5 is a partial plan view of a belt which adopts a bias joint method.

Investigation was conducted to survey influences of different methods of joining fabric pieces over a noise. Adopted joint methods are: an abutting sewing machine joint method shown in FIG. 2; a right-angle joint method shown in FIG. 4 (which overlaps fabric pieces at edges so that a wrap allowance t is orthogonal to the longitudinal direction of the belt and sews the fabric pieces together); and a bias joint method shown in FIG. 5 (which overlaps fabric pieces at edges so that a wrap allowance t is inclined with respect to the longitudinal direction of the belt and sews the fabric pieces together). In the right-angle joint method and the bias joint method above, a plurality of test belts were prepared which had different wrap allowances t and steps between fabric pieces. The wrap allowances t and the steps between the fabric pieces are as shown in Table 1.

TABLE 1

| Test Belt | Joint method | Wrap Allowance (mm) | Step In Surface (μm) |
| --- | --- | --- | --- |
| ① | Abutting Sewing Machine Joint | 0 | 0 |
| ② | Right-Angle Joint | 15 | 10 |
| ③ | " | 9 | 20 |
| ④ | " | 3 | 15 |
| ⑤ | Bias Joint | 6 | 25 |
| ⑥ | " | 10 | 30 |

Figure 6:
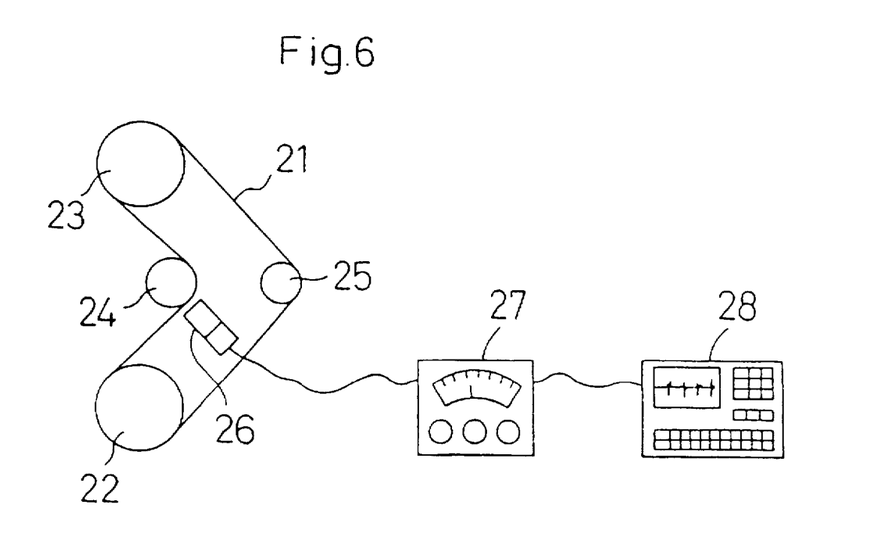
FIG. 6 is a view showing a method of measuring a noise created by a belt.

A method of measuring a noise is shown in FIG. 6. In FIG. 6, denoted at 21 is a test belt (V-ribbed belt). The test belt 21 is wrapped around a driving pulley 22 and a driven pulley 23, and an idler 24 and a guide pulley 25 are arranged between the driving pulley 22 and the driven pulley 23 in such a manner that a running direction of the belt is changed approximately by a right angle. In the vicinity of the idler 24, a microphone 26 is disposed on an inner face side of the belt 21. The microphone 26 is connected to a sound level meter 27 and a recorder 28. The diameter of the driving pulley 22 is 120 mm, and the rotation speed of the driving pulley 22 is 895 rpm. The diameter of the driven pulley 23 is 120 mm, and a load applied upon the pulley 23 is zero. The diameter of the idler 24 is 70 mm, and the diameter of the guide pulley 25 is 50 mm. Results of the measurement are shown in FIG. 7.

Figure 7:
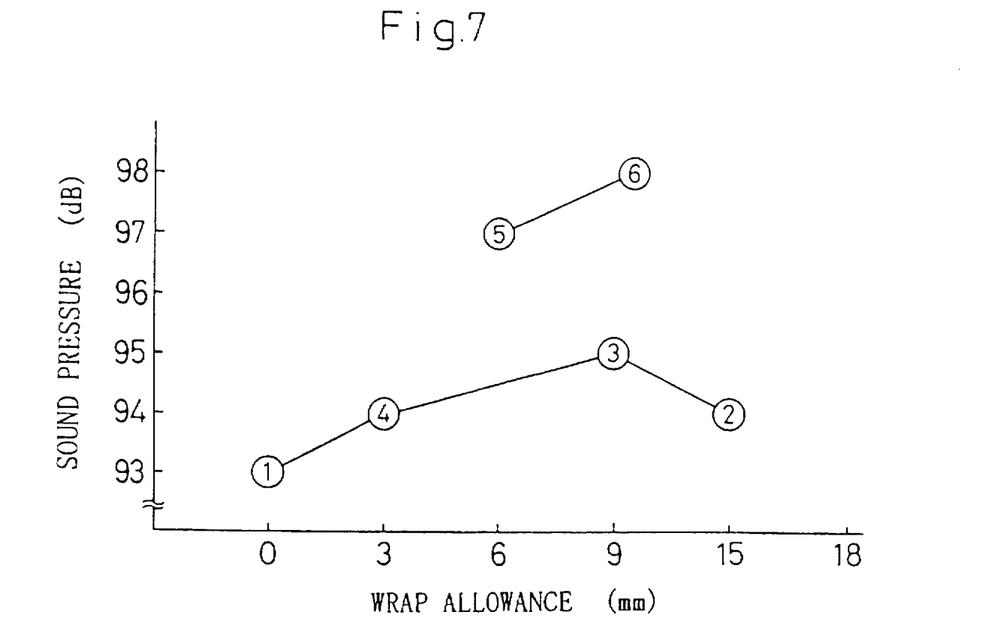
FIG. 7 is a graph showing a relationship between a wrap allowance of a fabric and a sound pressure.

According to FIG. 7, the abutting sewing machine joint method created the lowest noise. Further, FIG. 7 shows that the right-angle joint method creates a smaller noise than the bias joint method. In the right-angle joint method, with respect to the belts ② and ④, the sound pressure on the belt ② is the same as the sound pressure on the belt ④ which has the step of 15 μm even though the step is 10 μm in the belt ②. Hence, the larger the wrap allowance t is, the larger a noise becomes.

Figure 8:
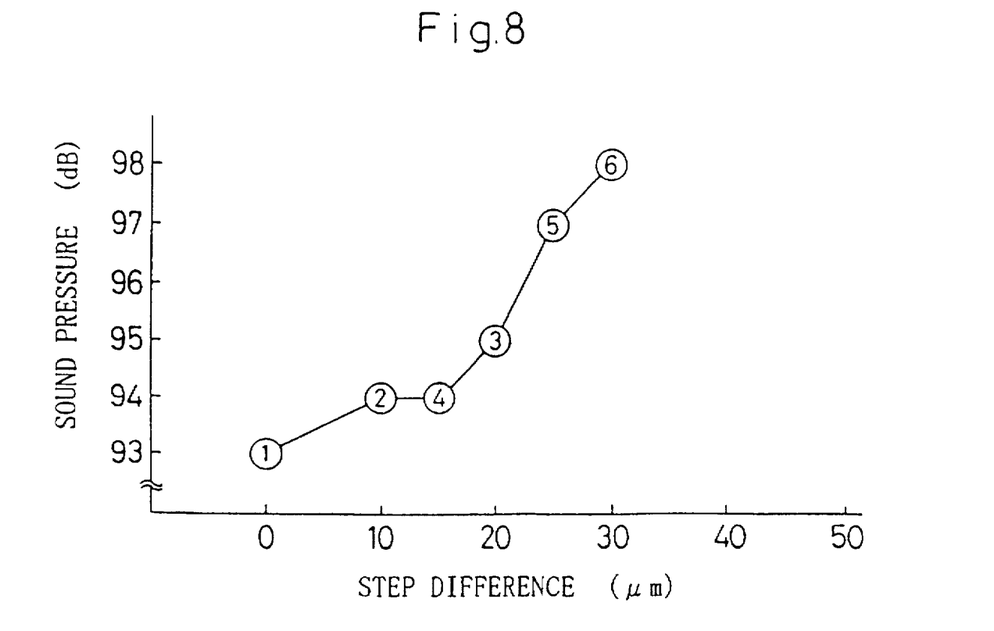
FIG. 8 is a graph showing a relationship between a surface step at a joining portion of a fabric and a sound pressure.

FIG. 8 shows the measurement results as a relationship between the step difference and a sound pressure. FIG. 8 shows that basically, a noise becomes larger as the step increases.

<Relationship Between Method Of Joining Fabric Pieces, Flexible Rigidity Of Belt And Noise>

Figure 9:
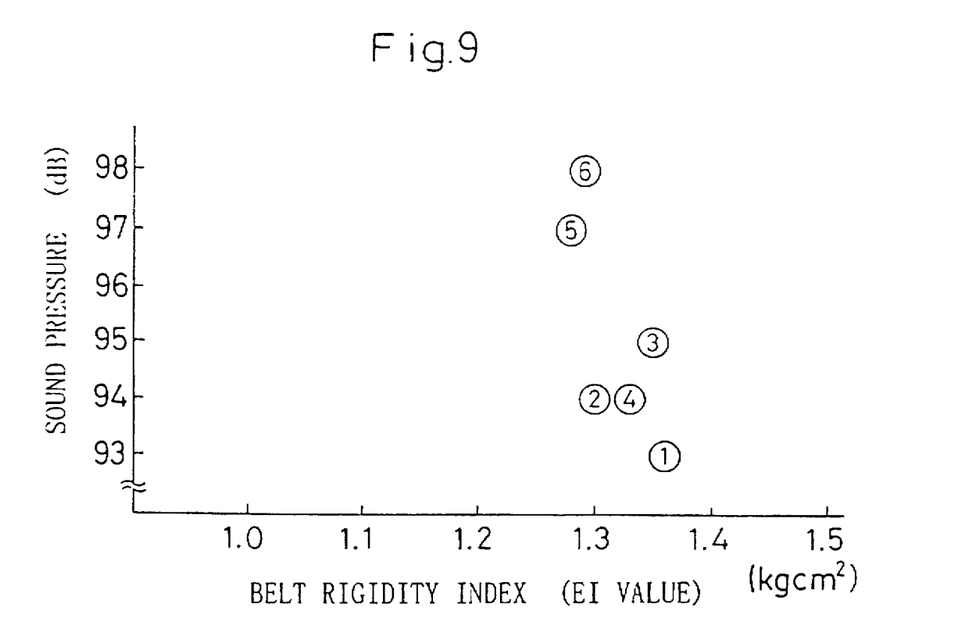
FIG. 9 is a graph showing a relationship between a rigidity index and a sound pressure of belts adopting different methods of joining fabrics.

Results as those shown in FIG. 9 were obtained, from flexible rigidities of the test belts ① to ⑥. From FIG. 9, it is understood that the belts of the abutting sewing machine joint method have higher flexible rigidities and excellent durabilities.

<Relationship Between Method Of Manufacturing Power Transmission Belt And Yield Of Producing Fabrics>

A rate of creation of a loss in a fabric was measured in the case where a band-like fabric was manufactured by the manufacturing method according to the above embodiment and a tubular fabric for making a belt was obtained from the band-like fabric, and in the case where a band-like fabric was manufactured by the conventional manufacturing method (See FIG. 12) and a tubular fabric for making a belt was obtained from the band-like fabric.

Figure 10:
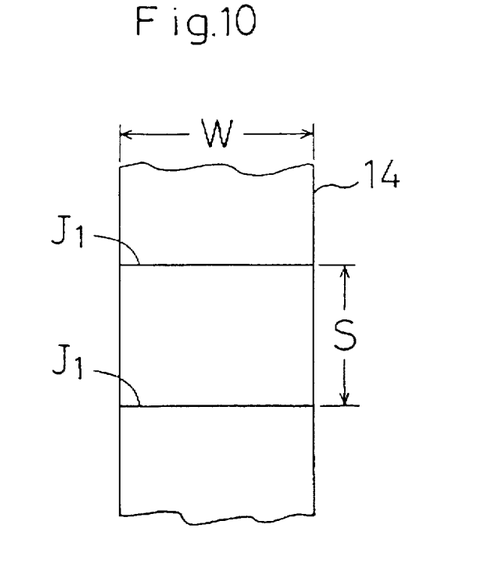
FIG. 10 is a plan view of a band-like fabric according to the embodiment, which is used to investigate a rate of creation of a loss in a fabric.
Figure 11:
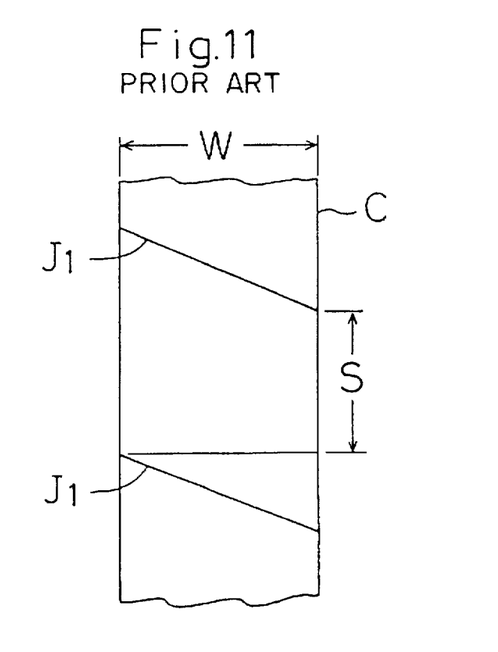
FIG. 11 is a plan view of a band-like fabric according to the conventional example, which is used to investigate a rate of creation of a loss in a fabric.

In other words, during manufacturing of the band-like fabric 14 according to the above embodiment as shown in FIG. 10, intervals S between adjacent joining lines $J_1$, $J_1$ were set to 820 mm while the width W of the band-like fabric 14 was set to 1,045 mm. Meanwhile, during manufacturing of the band-like fabric c in the conventional example as shown in FIG. 11, the minimum intervals S between adjacent joining lines $J_1$, $J_1$ were equally set to 820 mm, the width W of the band-like fabric c was equally set to 1,045 mm, while the joining lines $J_1$ were set at an angle of 68 degrees with respect to the longitudinal direction of the belt.

A condition for manufacturing of a tubular fabric was to space apart the joining lines $J_2$ each from the joining lines $J_1$ by 50 mm or more and to set the peripheral length of the tubular fabric to 765 mm. Under these conditions, how much loss of a fabric is created was measured, on each one of the band-like fabric 14 and the band-like fabric c. That is, a ratio of the quantity of cut (i.e., loss) to the total length of the band-like fabric was calculated, under the condition that if the joining lines $J_2$ are located within a range of 50 mm from the joining lines $J_1$ of the band-like fabric during cutting of the band-like fabric 14 or the band-like fabric c at intervals of 765 mm, determining that it is impossible to manufacture a tubular fabric, a portion of the band-like fabric is cut so that the joining lines $J_2$ are outside the range and so that the quantity of cut of the fabric is minimum. Table 2 shows the results for the case where the peripheral length is 1,065 mm and for the case where the peripheral length is 1,700 mm.

TABLE 2

| | Rate Of Creation Of Loss In Fabric (%) | |
| --- | --- | --- |
| Peripheral Length Of Top Fabric (mm) | Preferred Embodiment | Conventional Example |
| 765 | 0.52 | 36.7 |
| 1,065 | 0.52 | 39 |
| 1,700 | 0.17 | 39 |

From Table 2, it is understood that the manufacturing method according to the preferred embodiment has an extremely low rate of creation of a loss in a fabric.

<Another Method Of Manufacturing Power Transmission Belt>

Next, description is made about another method of manufacturing the above-mentioned V-ribbed belt 1.

Figure 12:
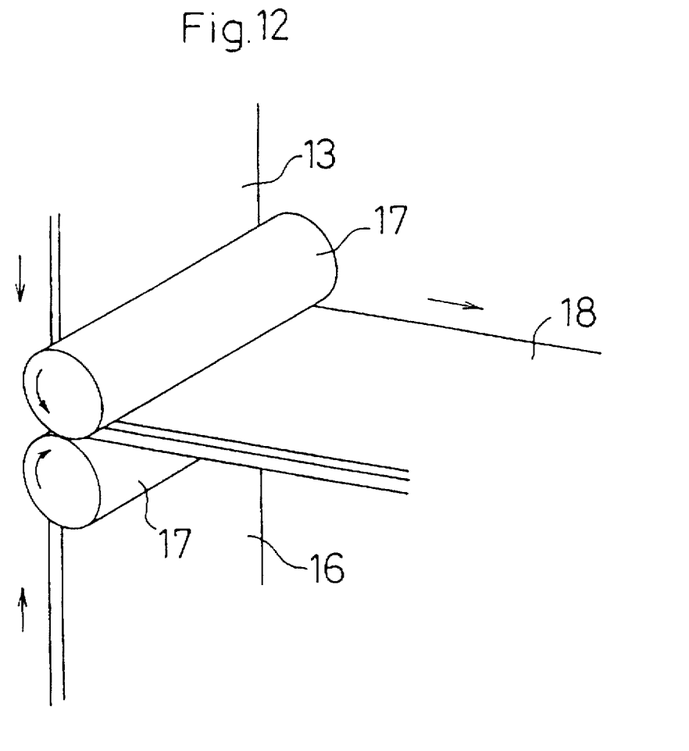
FIG. 12 is a perspective view showing a step of topping an uncured rubber sheet on a fabric.

A process for making a rubberized fabric 13 is the same as in above-mentioned manufacturing method. In this manufacturing method, as shown in FIG. 12, a fabric 13 and an uncured rubber sheet 16 for making a part to be located on the belt outer face side of the adhesion rubber 3 are inserted between a pair of calendar rolls 17, 17, so that the fabric 13 and the uncured rubber sheet 16 are stacked on each other and are pressed together, thereby forming a laminate 18 in which the fabric 13 and the rubber sheet 16 are formed into one piece.

The laminate 18 is cut at predetermined intervals in a direction orthogonal to the stretching direction of the rubberized fabric 13 thereby forming a plurality of laminate pieces. The plurality of laminate pieces are successively abutted and sewed at edges in the direction orthogonal to the stretching direction of the laminate pieces (the fabric 13 and the rubber sheet 16 are sewed together), so that a long laminate band is formed. Thereafter, the laminate band is cut at intervals corresponding to the peripheral length of a power transmission belt in a widthwise direction of the band-like fabric. The resultant cut piece thus obtained is rolled in the shape of a tube so that the rubber sheet 16 is located on the outer face side of the belt. Then, both cut edges of the cut piece are abutted on and sewed to each other (the fabric 13 and the rubber sheet 16 are sewed together) thereby forming a tube.

Figure 13:
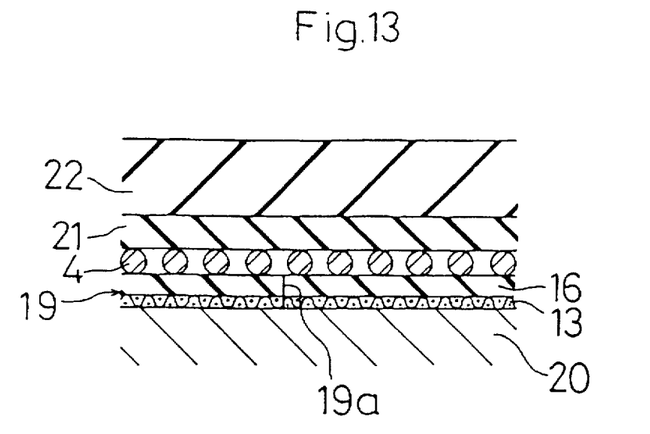
FIG. 13 is a partial cross sectional view showing a state that belt materials are set on a mandrel.

Subsequently, as shown in FIG. 13, the resultant tube 19 is fit into a cylindrical mandrel 20, a tension member 4, an uncured rubber sheet 21 for making a part to be located on the inner face side of the adhesion rubber 3 and an uncured rubber sheet 22 for making a rib rubber 5 are wrapped in this order around the mandrel 20, and the uncured rubber sheets are then cured, thereby forming a power transmission belt sleeve. In FIG. 13, reference numeral 19a shows a abutted joint part of both the cut edges of the tube 19.

The outer face of the power transmission sleeve is ground away by a grinding wheel so as to form multiple grooves extending in a circumferential direction at intervals in a width direction so that multiple ribs 6 are formed. Then, the power transmission belt sleeve is removed from the mandrel, is cut into round slices, and is turned inside out so that the V-ribbed belt 1 as that shown in FIGS. 1 and 2 is obtained.

According to this manufacturing method, since the uncured rubber sheet 16 to be formed into a part located on the outer face side of the adhesion rubber 3 is previously adhered to the fabric 13 for top fabric so that the rubber sheet 16 is formed into a tube 19, no special uncured rubber sheet for making a part located on the outer face side of the adhesion rubber 3 is required to be rolled around the mandrel. Though the tube 19 is formed into a tube by some laminated pieces, adjacent sheet pieces are abutted on and sewed to each other. Accordingly, the abutted joint part has no substantial step. This reduces production of vibration and noise when the resultant V-ribbed belt 1 is used.

Aside from a fabric for top fabric, if the uncured rubber sheet for making a part located on the outer face side of the adhesion rubber 3 is wrapped around the mandrel as in the conventional method, it is necessary to overlap both edges of the uncured rubber sheet so as to produce no clearance and no thin portion between both the edges of the uncured rubber sheet. Therefore, in the conventional method, the overlapped portion becomes thick so that slight unevenness occurs on the belt surface. However, the method of the present invention prevents an occurrence of such unevenness.

Although the preferred embodiment above is related to a V-ribbed belt, needless to mention, the present invention is also applicable to other types of power transmission belt such as a flat belt and a V-belt.

[INDUSTRIAL APPLICABILITY]

According to the present invention, since joining lines of adjacent fabric pieces for top fabric intersect at a right angle with respect to the longitudinal direction of the belt and are parallel to each other, this improves durability of the power transmission belt.

Further, according to the method of manufacturing a power transmission belt of the present invention, a power transmission belt excellent in durability as mentioned above can be obtained.

We claim:

1. A power transmission belt with a top fabric on a back face of the belt, comprising:
   a top fabric formed from a plurality of rubberized woven fabric pieces which are joined at adjacent edges in the shape of a ring,
   each of the rubberized fabric pieces being arranged such that warps and wefts thereof intersect each other at an obtuse angle which is open toward the longitudinal direction of the belt, wherein
   each joining line of any adjacent fabric pieces extends in a direction orthogonal to the longitudinal direction of the belt, and wherein said adjacent fabric edges are abutted together without overlapping and are joined by stitches to form a sewed portion, variations in the height between said adjacent edges in the sewed portion being 14 μm or smaller on the back face side of the belt to reduce noise when belt is in operation.

2. A power transmission belt according to claim 1, wherein said stitches are formed from a sewing thread and extend in the direction of the length of the belt.

3. A power transmission belt according to either of claims 1 and 2, further comprising:
   a tension member extending in the longitudinal direction of the belt;
   an adhesion rubber for keeping the tension member at a proper position; and
   a compression rubber bonded to the inner face of the adhesion rubber, wherein
   the outer face of the adhesion rubber is covered with the top fabric, and
   a plurality of V-shaped ribs are arranged on the inner face side of the compression rubber to extend in the longitudinal direction of the belt.

4. A power transmission belt according to claim 2, comprising:
   a tension member extending in the longitudinal direction of the belt;
   an adhesion rubber for keeping the tension member at a proper position; and
   a compression rubber bonded to the inner face of the adhesion rubber, wherein
   the outer face of the adhesion rubber is covered with the top fabric,
   the adhesion rubber is formed from two rubber sheets respectively located on the belt inner face side and the belt outer face side with the tension member interposed between the rubber sheets,
   the top fabric being formed in the shape of a ring from abutted and sewn edges of a band-like fabric, said band-like fabric being made of the plurality of fabric pieces and being formed into the length corresponding to the entire length of the power transmission belt, and
   the rubber sheet located on the belt outer face side being stacked on the fabric forming said top fabric so as to be integral therewith, and being abutted at both edges while the fabric forming the top fabric is abutted at both edges, and is sewed at both the edges together with both the edges of the fabric for top fabric.

5. A method of manufacturing a power transmission belt, comprising the steps of:

cutting a tubular woven fabric spirally at an angle of 45 degrees with respect to the direction of the length of the tube to form a fabric strip;

stretching the strip of fabric in the direction of cutting so that warps and wefts of the fabric intersect each other at an obtuse angle, and rubberizing the stretched fabric so that the warps and the wefts are fixed at the intersecting angle;

cutting the rubberized fabric at predetermined intervals in a direction orthogonal to the direction of stretching to create a plurality of fabric pieces;

successively sewing the plurality of fabric pieces at edges that are oriented in a direction orthogonal to the direction of stretching to create a long band-like fabric having sewn portions;

cutting the band-like fabric at intervals corresponding to a peripheral length of a top fabric of a power transmission belt, in the direction orthogonal to the direction of stretching;

sewing the resultant fabric at edges to obtain a tubular fabric for top fabric;

fitting the tubular fabric onto a cylindrical mandrel, wrapping an uncured rubber sheet, a tension member and an uncured rubber sheet around the mandrel in this order on the tubular fabric, and curing the uncured rubber sheets to form a power transmission belt sleeve; and removing the power transmission belt sleeve from the mandrel, cutting the power transmission belt sleeve into round slices, and reversing the cut sleeve inside out thereby obtaining a power transmission belt.

6. The method of manufacturing a power transmission belt according to claim 5, wherein when the band-like fabric is formed and when the tubular fabric for top fabric is formed, both edges of the fabric are abutted on and sewed to each other to form said sewn portions.

7. A method of manufacturing a power transmission belt according to claim 6, wherein both the edges of the fabric are sewed together with a sewing thread to form stitches that extend in the longitudinal direction of the fabric.

8. A method of manufacturing a power transmission belt, comprising the steps of:

cutting a tubular woven fabric spirally at an angle of 45 degrees with respect to the direction of the length of the tube to form a strip of cut fabric;

stretching the strip of fabric in the direction of cutting so that warps and wefts of the fabric intersect each other at an obtuse angle, and rubberizing the fabric so that the warps and the wefts are fixed at the intersecting angle;

stacking an uncured rubber sheet on one face of the rubberized fabric and pressing the rubber sheet and the fabric to form a laminate in which the fabric and the rubber sheet are formed into one piece;

cutting the laminate at predetermined intervals in a direction orthogonal to the direction of stretching to form a plurality of laminate pieces;

successively abutting and sewing the plurality of laminate pieces at edges to form a long laminate band;

cutting the laminate band at intervals corresponding to the peripheral length of the power transmission belt in the direction orthogonal to the direction of stretching;

rolling the resultant cut piece into a tube so that the rubber sheet is located on the outer periphery side and abutting and sewing both edges of the cut piece thereby forming a tube;

fitting the tube onto a cylindrical mandrel, wrapping a tension member and an uncured rubber sheet around the mandrel in this order on the tube, and curing the uncured rubber sheets to form a power transmission belt sleeve; and removing the power transmission belt sleeve from the mandrel, cutting the power transmission belt sleeve into round slices, and reversing the cut sleeve inside out thereby obtaining a power transmission belt.

9. A method of manufacturing a power transmission belt according to claim 8, wherein when edges of the laminate pieces are sewed together and when edges of the cut piece are sewed together, a sewing thread is used to form stitches that extend in the longitudinal direction of the power transmission belt.

10. A power transmission belt with a top fabric on a back face of the belt, comprising:

a top fabric formed from a plurality of rubberized woven fabric pieces which are joined at adjacent edges in the shape of a ring, each of the rubberized fabric pieces being arranged such that warps and wefts thereof intersect each other at an obtuse angle which is open toward the longitudinal direction of the belt, wherein each joining line of any adjacent fabric pieces extends in a direction orthogonal to the longitudinal direction of the belt.

* * * * *